Jan. 16, 1951     E. M. WILLIAMS     2,538,068
PANORAMIC RECEIVER

Filed Nov. 1, 1944     2 Sheets-Sheet 2

INVENTOR.
EVERARD M. WILLIAMS
BY
William D. Hall.
ATTORNEY

Patented Jan. 16, 1951

2,538,068

UNITED STATES PATENT OFFICE 2,538,068

PANORAMIC RECEIVER

Everard M. Williams, State College, Pa.

Application November 1, 1944, Serial No. 561,457

12 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to panoramic receivers, and more particularly to a panoramic receiver circuit for indicating signals in a plurality of bands with a minimum of components.

The principal object of the present invention is to provide a superheterodyne receiver of the panoramic type in which signals in at least two frequency bands, one of which is the image of the other, are indicated upon a common indicator without ambiguity. It is a further object of this invention to increase the signal-to-noise ratio of such receivers.

With the above and other objects in view which will be apparent to those who are informed in the field of panoramic receivers and the like, from the following discussion, a suitable illustrative embodiment of the present invention is shown in the accompanying drawing, wherein.

Figure 1:
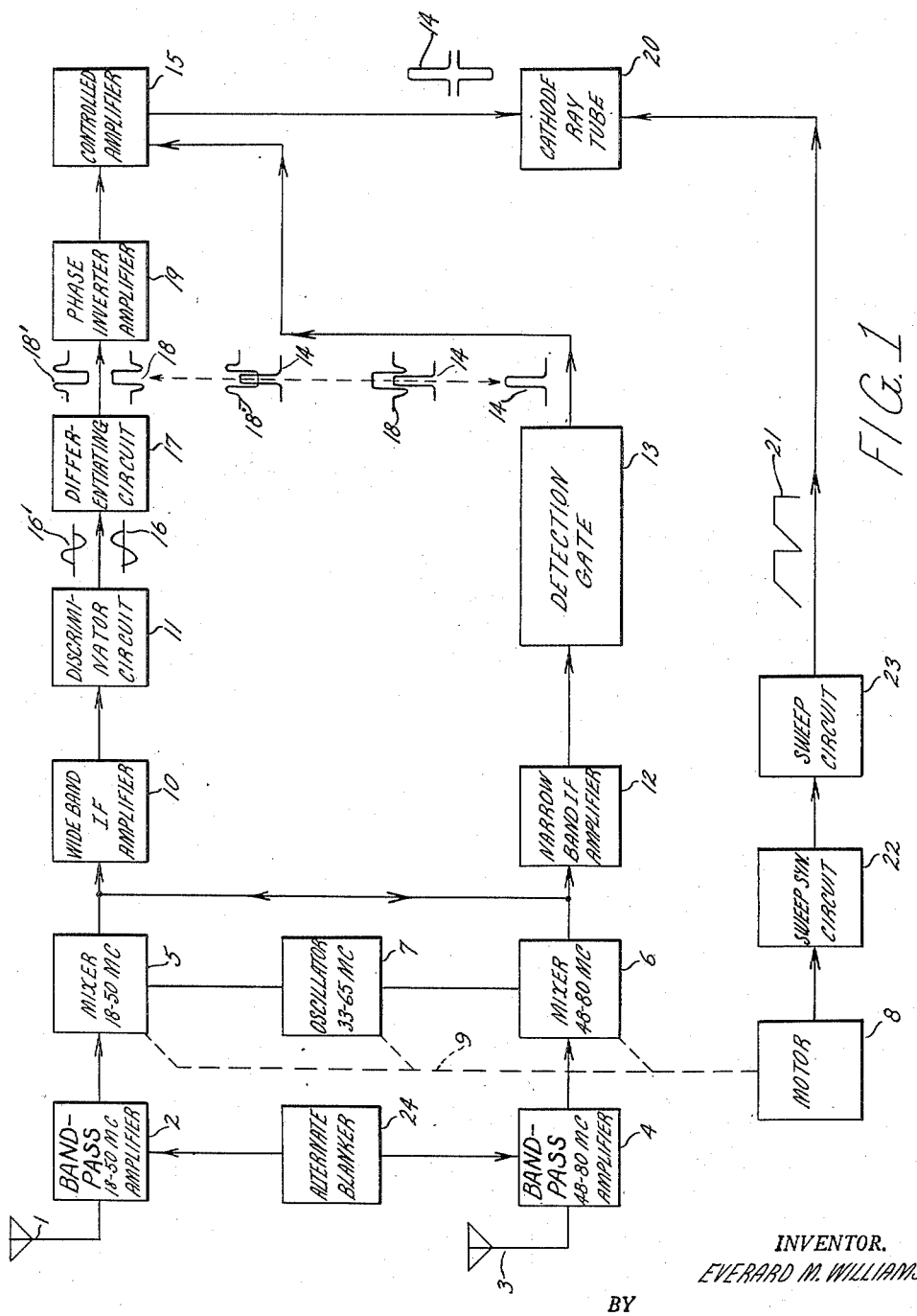
Fig. 1 is a block diagram of a circuit that embodies the present invention.

The wide band panoramic receiver that is shown in Fig. 1 of the drawings comprises an automatic wide frequency range panoramic search receiver that preferably has two separate antennas 1 and 3.

The antenna 1 feeds a low-frequency band part of the search receiver. The antenna 3 feeds a high-frequency band part of the search receiver. The antenna 1 feeds a fixedly-tuned radio frequency band-pass amplifier 2 of a low-frequency range, such as the range between 18 and 50 megacycles, as shown. The antenna 3 feeds a fixedly-tuned radio frequency band-pass amplifier 4 of a supplemental higher frequency range, such as the frequency range of from 48 to 80 megacycles, as shown.

The amplifier 2 feeds into a panoramic mixer 5 and the amplifier 4 feeds into a panoramic mixer 6. The mixers 5 and 6 are both supplied from a common local oscillator 7 that is of a related frequency range, such as, for example, the range of from 33 to 65 megacycles shown.

The input circuits of mixers 5 and 6 are simultaneously variably tuned by a ganged condenser assembly that is indicated by a dotted line 9. The ganged condenser assembly 9 is driven by a motor 8. In the ganged condenser assembly, one condenser unit tunes the mixer circuit 5 while another condenser unit simultaneously tunes the mixer circuit 6 and a third condenser assembly tunes the oscillator 7. This tuning is accomplished preferably by using a type of mechanically balanced condenser wherein a pair of segments of each rotating condenser plate are disposed upon diametrically opposite sides of the condenser shaft so that they counterbalance each other during rotation. The stationary plates are also disposed in opposite segments with a clearance disposed therebetween for the condenser shaft. Preferably three of these condenser sections are used and each section differs in the number of rotating plates and stationary plates from those of the other condenser sections, in order that the individual condenser sections cover differences in frequency ranges. The rotating condenser plates are dimensioned for their respective frequency ranges.

In the chosen example, the mixer 5 tunes over a frequency band of from 18 to 50 megacycles which, combined with the oscillator frequency of 33 to 65 megacycles, that is concurrently variably tuned with the mixers 5 and 6, provides normally a frequency difference of 15 megacycles that is fed into the intermediate frequency wide band amplifier 10 and into the intermediate frequency narrow band amplifier 12. In a corresponding manner, the mixer 6 tunes over a frequency band of from 48 to 80 megacycles which, mixed with the variably tuned oscillator frequency of 33 to 65 megacycles, similarly gives normally a frequency difference of 15 megacycles that is fed into the intermediate frequency narrow band amplifier 12 as well as into the intermediate frequency wide band amplifier 10. From the above frequency values, it will be evident that one of the frequency bands is the image-frequency band of the other, since they differ from each other by twice the intermediate frequency, in this case 30 megacycles.

The output of the circuits of both mixers 5 and 6 that are fed into the wide band amplifier 10 is passed thereby to a discriminator circuit 11 tuned to a mean frequency determined by the differences in frequency tuning between the oscillator 7 and the two mixers 5 and 6, and in the cited example is 15 megacycles.

The output of discriminator 11 provides pulses which are applied to a differentiating circuit 17, the output of which is, in turn, fed to a phase inverter amplifier 19. This amplifier provides a balanced, push-pull output which is fed to controlled amplifier 15. The latter is also a push-pull amplifier which feeds signals in push-pull to the vertical deflecting plates of a cathode ray tube 20.

The narrow band intermediate frequency amplifier 12, that is fed from the mixers 5 and 6, receives and passes the same signals as those received and passed by the wide band amplifier 10.

The narrow band intermediate frequency amplifier 12 passes signals to a detection gate 13 which forms a much sharper pulse than the discriminator output. The detection gate 13 sharpens and elongates the pulses from the narrow band intermediate frequency amplifier 12 and clips the pulses to an elongated square or rectangular wave gating signal 14 of a constant amplitude which is then passed to the controlled amplifier 15.

A continuous linear sweep is maintained upon the cathode ray tube 20 in any desired manner, as by a clipped sawtooth wave 21 or the like. The sawtooth wave 21 is preferably maintained by means of a sweep synchronizing circuit 22 that contains continuously variable condensers that are operated by the motor 8. The sweep synchronizing circuit 22 passes to a sweep circuit 23 which maintains a continuous trace that appears as a visible line upon the screen of the cathode ray tube 20.

An alternate blanker 24 may be provided where desired, for alternately blanking out the low and the high frequency channels. The blanker 24 preferably is disposed between the low band amplifier 2 and the high band amplifier 4.

Figure 2:
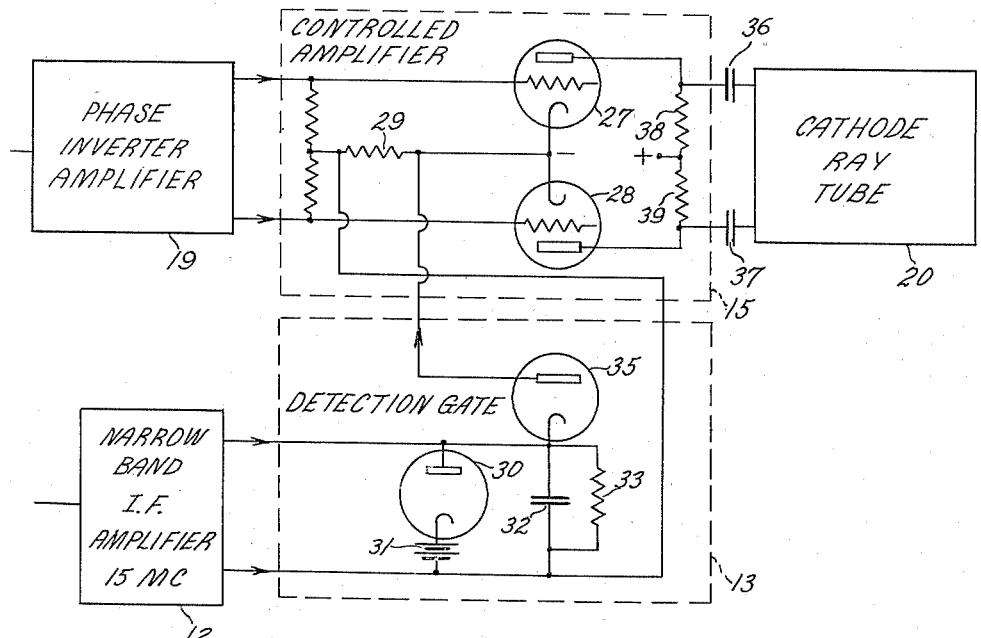
Fig. 2 is a schematic diagram of detailed novel parts of the circuit that is shown in Fig. 1 with block portions of the circuit connected thereto to indicate the relationship therebetween.

In the schematic diagram that is shown in Fig. 2 of the accompanying drawings, the balanced output of the phase inverter amplifier 19 is applied in push-pull to the grids of a pair of controlled amplifier push-pull triodes 27 and 28 that are normally biased beyond cut-off. The output of the gated detector 13 supplies a transitory bias of a fixed value above cut-off across a resistor 29.

The output of the narrow band intermediate frequency amplifier 12 is applied across a diode 30 through a battery 31 whose positive post is connected to the cathode of the diode 30, and a cathode bias comprising a direct current stopping condenser 32 that is shunted by a resistor 33. The direct current signal across the resistor 33 is applied between the cathode and the plate of another diode 35. The resistor 29 is disposed in the plate circuit of the diode 35 and also is in the cathode circuit of the controlled amplifier triodes 27 and 28.

The plates of the controlled amplifier push-pull triodes 27 and 28 are connected through the condensers 36 and 37 to the cathode ray tube 20. A pair of resistors 38 and 39 are connected between the plates of the triodes 27 and 28. A positive voltage source is connected between the two resistors 38 and 39 and therethrough across the plates of the controlled amplifier triodes 27 and 28.

The present invention comprises a broad band panoramic receiver which permits a broad band of frequencies to be inspected visually upon an oscilloscope frequency calibrated screen for the presence of signals.

The receiver comprises a low frequency band and a high frequency band together with means for distinguishing between signals of the low frequency band from signals of the high frequency band.

This result is accomplished by providing an intermediate frequency output that is frequency modulated with increasing frequency in the lower band of from 18 to 50 megacycles as shown, and decreasing frequency in the upper band of from 48 to 80 megacycles as shown. The intermediate frequency output is also amplitude modulated in conformity with the shape of the intermediate frequency pass band. Because of the wide band characteristic of the amplifier 10, each frequency at the input of each mixer appears as a frequency modulated signal at the output of intermediate frequency amplifier 10. For each frequency present in the output of amplifier 10, the discriminator provides in its output a pulse of a duration dependent upon the width of the band pass of said amplifier and the rate of sweep of oscillator 7. The form of this pulse is dependent upon the shape of the band-pass characteristic and the degree of linearity of the frequency sweep of oscillator 7.

Figure 3:
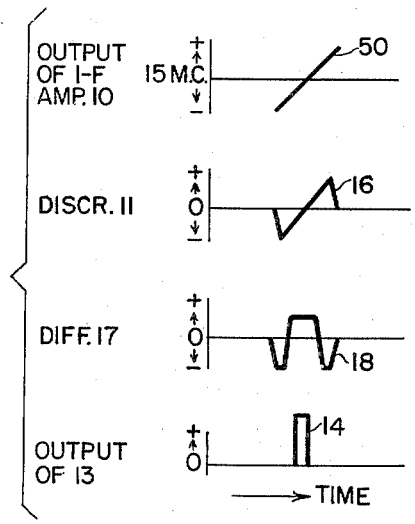
Fig. 3 represents a series of graphs illustrating the operation of various portions of the receiver shown in Fig. 1.

The operation of this portion of the circuit will now be illustrated with reference to the graphs in Fig. 3. Let it be assumed that the band-pass characteristic of amplifier 10 is perfectly flat and has sharp cut-off at the upper and lower limits. Then, since the frequency of local oscillator 7 is normally varied linearly with time, each excursion of the oscillator tuning means will provide, for each signal in the input of a mixer, a signal, such as 50 in Fig. 3, in the output of amplifier 10, which signal is linearly varied upward in frequency with time. The resulting output pulses in the discriminator will then vary in voltage linearly with time, as shown at 16. This will be obvious from the following considerations: Discriminator 11 is normally tuned to provide zero output when the applied signal frequency is equal to the mean frequency of the pass-band of amplifier 10, in this case 15 megacycles. Because of the broad band characteristics of amplifier 10, the first beat frequency to pass through the amplifier will be at the lower limit of said band pass, which is below said mean frequency. As a result, an output voltage will immediately appear in the discriminator, said voltage being negative. As the frequency rises linearly to and above said mean frequency, said negative voltage will decrease to zero and then become positive. As said frequency passes the upper cut-off limit of amplifier 10, the discriminator output will immediately die down to zero. This cycle will be repeated at every cycle of frequency sweep of the oscillator. Since wave 16 is a sawtooth wave, the differentiator 17 will produce a substantially square wave output as shown at 18.

Waves 50, 16 and 18 result from signals in one of the frequency bands. For signals in the other frequency band, the frequency variation will decrease with time at each cycle of frequency sweep of the oscillator, and the polarity characteristics of waves 16 and 18 will be reversed.

The output of differentiator 17 is now applied to phase inverter 19 which supplies a balanced, push-pull output to amplifier 15, which normally does not pass any signal until a gating pulse 14 is received from detection gate 13.

The narrow intermediate frequency band channel very largely eliminates the minor irregularities in and sharpens the pulses that pass therethrough. Because of the narrow band characteristics of the narrow band intermediate frequency amplifier 12, signals that are fed thereto are passed for a very short interval of time as compared with the time interval that accompanies the passage of signals through the wide band intermediate frequency amplifier 10. It will therefore be apparent that a very sharp pulse of signal is formed in the detection gate 13 of a shape such as that shown at 14. This signal is applied to the controlled amplifier 15 in such a manner as to render the controlled amplifier 15 active.

It will be noted that, since the signal from the detection gate 13 is applied in the same phase to both of the tubes 27 and 28 of the controlled amplifier 15, said signal would normally be balanced out in the absence of a signal from phase inverter 19. However, when both signals occur simultaneously, tubes 27 and 28 serve to amplify and pass signals of a polarity dependent upon which frequency band the signal is received in. Since the controlled amplifier 15 is a push-pull amplifier, the positive or the negative sense of the pulses that are received from the phase inverter amplifier 19 will be preserved. The width of these pulses will be decreased to the narrow width of the gating signal 14.

Figure 4:
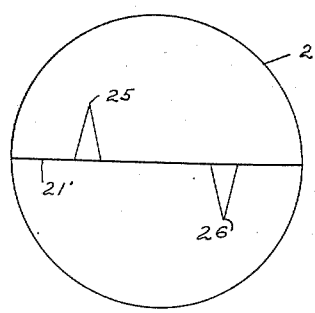
Fig. 4 is a plain view of the screen of the cathode ray tube in the system shown in Fig. 1, illustrating the manner in which signals in the different frequency bands are indicated.

The trace presentation upon the screen 20' of the cathode ray tube 20 from the output of the controlled amplifier 15 is in the form of pips that extend upward for signals from one band and downward for signals from the other band depending upon the connections used. The pips 25 and 26 shown in Fig. 4 are illustrative of such pips and extend upwardly for the low frequency band and downwardly for the high frequency band, respectively, from a common ground line 21' that is maintained by the sawtooth wave voltage output from the sweep circuit 23.

The detection gate 13, due to the fact that it permits the controlled amplifier 15 to operate only when signals above a certain minimum amplitude are received, has the effect of suppressing noise hash from the presentation upon the screen of the cathode ray tube 20.

The alternate blanker 24 serves the purpose of preventing the wide band channel from receiving simultaneously signals in both the low and the high frequency bands. In the absence of the alternate blanker 24, two signals differing by twice the receiver intermediate frequency would tend to cancel each other in the discriminator circuit and neither signal would appear in the presentation upon the screen of the cathode ray tube 20. By permitting first one and then the other signal to pass, both signals are successively presented and appear to an observer to be simultaneous in the presentation. The frequency of the blanking wave from blanker 24 is not critical and can vary between wide limits. Preferably, the lowest limit should be just sufficient to provide a steady presentation of signals on the screen of the oscilloscope, and the upper limit should not be higher than one which provides a period of separation of each channel which is long enough to permit the tuning of the local oscillator to sweep through one cycle. However, frequencies outside these limits are also usable.

The motor driven sweep synchronizing circuit 22 serves to provide a normal sweep voltage to the cathode ray tube 20. Since the motor 8 is common to both the sweep synchronizing circuit 22 and to the frequency sweep of the oscillator 7, successive pips from the same signal source are presented at the same position on the screen of the cathode ray tube 20. The screen of the cathode ray tube 20 preferably bears two calibrated scales, not shown, one scale for the low band and the other scale for the high band of the receiver. The phase inverter amplifier 19 converts unbalanced signal into signal balanced to ground, in preparation for passing the signal to the controlled amplifier 15 which is a balanced amplifier.

The receiver circuit that is disclosed herein has the advantage that it distinguishes between signals in the low and in the high frequency bands. It has the further advantage that the signal is not vitiated or given a false result by high band signals which pass through the low frequency band radio frequency stage or by low frequency band signals which pass through the high frequency band radio frequency stage. Such signals are still properly assigned to their proper band in the presentation, since their beat frequency signal possesses the frequency characteristic of one of the radio frequency bands of the receiver. By this means the problem of confusion that arises from image frequencies is solved in this equipment with no chance of ambiguity.

It is to be understood that the particular circuits and the particular components and the arrangement thereof that have been shown and described herein have been submitted for the purposes of illustrating and describing suitable embodiments of the present invention, and that properly functioning substitutions and modifications may be made therein without departing from the scope of the present invention as defined by the appended claims.

What I claim is:

1. A panoramic receiver of the character described comprising in combination a cathode ray tube including a screen, means for maintaining a single trace upon the screen of said cathode ray tube, a first frequency band channel for receiving signals lying within said first frequency band, a second frequency band channel for receiving signals lying within said second frequency band, and means responsive to the outputs of said first and second channels for producing voltages of a first polarity in response to signals in said first channel and of an opposite polarity in response to signals in said second channel, and means for deflecting the trace upon the cathode ray tube screen in one direction in response to voltages of said first polarity and in the opposite direction in response to voltages of said opposite polarity.

2. A panoramic receiver of the character described comprising in combination a cathode ray tube including a screen, means for presenting superposed panoramic spectra upon the screen of said tube, a first frequency band channel, a second frequency band channel, means for intercepting and passing signals to said first and second channels, a third channel connected to receive signals from both said first and second channels, and adapted to feed signals to said tube, a fourth channel, including discriminating means connected to receive signals from both said first and second channels and adapted to feed signal to said tube, means associated with said third and fourth channels for causing to appear on said screen marks indicative of the frequencies of signals received in said first and second frequency channels, and means responsive to the discrimination accomplished in said fourth channel to distinguish the marks identifying the frequencies of signals received in said first channel from the marks identifying the frequencies of signals received in said second channel.

3. In a two band panoramic receiver including a signal presentation means, a first frequency band channel, a second frequency band channel, a heterodyne oscillator of continuously varying frequency forming intermediate frequency signals by subtraction of the heterodyne frequency from signal frequency in said first channel and by subtraction of signal frequency in said second channel from the heterodyne frequency, a discriminator associated with said first and second channels for forming pulses having an alternation of polarity of one order for signals in said first channel and in the reverse order for signals in said second channel, differentiating means converting said pulses into pulses of voltage of one polarity for signals in said first channel and of the opposite polarity for signals in said second channel, a narrow band amplifier and rectifier for detecting intermediate frequency signals from said first and second channels to form detected pulses, two grid-controlled tubes having their grid-cathode circuits in push-pull connection for receiving pulses from said differentiating means, and in parallel connection for receiving detected pulses from said rectifier, and having their outputs connected in push-pull across the signal electrodes of the signal presentation means.

4. In a two band panoramic receiver including a signal presentation means, a first frequency band channel, a second frequency band channel, a heterodyne oscillator generating a uniformly varying heterodyne frequency, a first mixer forming an intermediate frequency by subtraction of heterodyne frequency from signal frequency in said first channel, a second mixer forming an intermediate frequency by subtraction of signal frequency in said second channel from the heterodyne frequency, a discriminator receiving intermediate frequencies from said mixers and forming pulses having an alternation of polarity of one order for signals in said first channel and in the reverse order for signals in said second channel, differentiating means converting said pulses into pulses of voltage of one polarity for signals in said first channel and of the opposite polarity for signals in said second channel, a narrow band amplifier and rectifier for detecting intermediate frequency signals from said mixers to form detected pulses, two grid-controlled tubes having their grid-cathode circuits in push-pull connection for receiving pulses from said differentiating means, and in parallel connection for receiving detected pulses from said rectifier, and having their outputs connected in push-pull across the signal electrodes of the signal presentation means.

5. A panoramic receiver of the character described, comprising in combination a cathode ray tube having a screen, means for applying a time sweep to the screen of said tube, a low frequency band channel, a high frequency band channel supplementing the frequency of said low frequency band channel to provide an overall wide frequency band for the panoramic receiver, a first tunable mixer in said low frequency band channel, a second tunable mixer in said high frequency band channel, a tunable oscillator connected to and supplying heterodyne frequency to both of said mixers and of a frequency range overlapping a part of both of the frequency ranges of said mixers, motor means operating said means for applying a time sweep to the screen of said cathode ray tube and continuously and synchronously tuning of said oscillator and mixers, blanking means for alternately blanking out said low frequency band channel, an amplitude variation detector for receiving signals from said mixers, frequency discriminator means for receiving signals from said mixers, controlled amplifier means associated with both said signal discriminator means and said detection gate means and connected with said cathode ray tube so that signals in said low frequency band channel causes the trace on the tube screen to be deflected to one side of its normal position, and signals in the high frequency band channel causes the trace to be deflected to the opposite side of its normal position.

6. A wide band panoramic receiver, comprising in combination a low frequency band channel, a high frequency band channel, said frequency bands being images of each other, a fixedly-tuned, band-pass amplifier in each of said channels, a mixer in each of said channels, a tunable heterodyne oscillator feeding both of said mixers, a visual presentation means having a screen, means for synchronously sweeping the frequency of said oscillator and maintaining a trace upon the screen of said visual presentation means, a wide band intermediate frequency amplifier connected to receive output from said mixers, a narrow band intermediate frequency amplifier connected to receive output from said mixers, an amplitude-variation detector connected to receive output from said narrow band intermediate frequency amplifier, a frequency-variation detector connected to receive output from said wide band intermediate frequency amplifier, and means jointly controlled by said detectors to cause the trace upon the screen thereof to be deflected to one side upon the reception of signals in said low frequency band channel and to the opposite side upon the reception of signals in said high frequency band channel.

7. A panoramic receiver comprising, in combination, a pair of superheterodyne channels respectively tunable over different frequency bands, one of which is the image of the other, a tunable mixer in each channel, a tunable heterodyne oscillator coupled to both mixers and having a mean frequency intermediate said frequency bands, periodic means for synchronously varying the tuning of said mixers and said oscillator, first and second intermediate frequency amplifiers, each of said amplifiers being coupled to both of said mixers, said first intermediate frequency amplifier having a narrower band pass than the second, an amplitude variation detector coupled to the output of said first intermediate frequency amplifier and responsive only to potentials above a predetermined amplitude, a frequency discriminator excited by the output of said second intermediate frequency amplifier, a differentiating circuit excited by the output of said discriminator, a normally-blocked, push-pull amplifier controlled by the output of said differentiating circuit, means responsive to the output of said detector to unblock said amplifier, a cathode ray tube, means controlled by said periodic means for deflecting the beam of said tube along one coordinate, and means excited by the output of said push-pull amplifier to deflect said beam along a second coordinate.

8. In a superheterodyne receiver having signal-frequency amplifier means, mixer means receptive of the output of said amplifier means, a local oscillator, and an intermediate-frequency amplifier receptive of the output of said mixer means: means for differentiating between a given frequency signal and its image frequency signal, both of which signals are impressed on said receiver, said means comprising means for frequency modulating said oscillator, means for alternately tuning said signal-frequency amplifier to said signals, means including a frequency-variation detector receptive of the output of said intermediate-frequency amplifier for deriving output signals of different polarity characteristics from said given frequency signal and image frequency signal, respectively, and a polarized indicator means coupled to said last-named means for indicating the polarity characteristics of the output signals of said detector.

9. In a superheterodyne receiver having signal-frequency amplifier means, mixer means receptive of the output of said amplifier means, a local oscillator, and an intermediate-frequency amplifier receptive of the output of said mixer: means for distinguishing between a given frequency signal and its image frequency signal, both of which signals are impressed on said receiver, said last means comprising means for alternately tuning said signal frequency amplifier means to said signals, means for deriving from the given frequency signal and the image frequency signal, respectively, resultant signals which are frequency modulated in opposite directions, and means for indicating the direction of modulation of the resultant frequency modulated signals.

10. A superheterodyne receiver comprising an input circuit including means for rendering said receiver alternately responsive to signals in a given frequency band and signals in the image frequency band of said given frequency band, local oscillator, mixer means in said input circuit, a fixedly-tuned intermediate-frequency amplifier coupled to said mixer means, means for sweeping the frequency of the local oscillator, whereby signals in the respective bands result in intermediate frequency signals varying in frequency in opposite directions, and means for indicating the direction of the frequency variations of the intermediate frequency signals.

11. A superheterodyne receiver comprising an input circuit including means for rendering said receiver alternately responsive to signals in a given frequency band and signals in the image frequency band of said given frequency band, mixer means receptive of the output of said amplifier means, an intermediate frequency amplifier, frequency-modulated local oscillator means for heterodyning said signals to the same intermediate frequency, whereby signals in the respective bands result in intermediate frequency signals varying in frequency in opposite directions, and means for indicating the direction of the frequency variations of the intermediate frequency signals.

12. In a superheterodyne receiver having signal-frequency amplifier means, mixer means receptive of the output of said amplifier means, and a local oscillator: means for differentiating between a given frequency signal and its image frequency signal, both of which signals are impressed on said receiver, said means comprising means for frequency modulating said oscillator, means for alternately tuning said amplifier to said signals, means including a frequency-variation detector receptive of the output of said mixer for deriving output signals of different polarity characteristics from said given frequency signal and said image frequency signal respectively, and a polarized indicator means coupled to said last-named means for indicating the polarity characteristics of the output signals of said detector.

EVERARD M. WILLIAMS.

REFERENCES CITED

The following references are of record in the file of this patent:

UNITED STATES PATENTS

| Number | Name | Date |
|---|---|---|
| 2,121,359 | Luck et al. | June 21, 1938 |
| 2,178,074 | Jakel et al. | Oct. 31, 1939 |
| 2,213,886 | Potter | Sept. 3, 1940 |
| 2,262,218 | Andrews | Nov. 11, 1941 |
| 2,378,604 | Wallace | June 19, 1945 |
| 2,381,940 | Wallace et al. | Aug. 14, 1945 |
| 2,465,500 | Wallace et al. | Mar. 29, 1949 |